(12) United States Patent
Harvey (10) Patent No.: US 11,392,096 B2
(45) Date of Patent: Jul. 19, 2022

(54) HEURISTIC METHOD OF AUTOMATED AND LEARNING CONTROL, AND BUILDING AUTOMATION SYSTEMS THEREOF

(71) Applicant: PassiveLogic, Inc., Holladay, UT (US)

(72) Inventor: Troy Aaron Harvey, Brighton, UT (US)

(*) Notice: Subject to any disclaimer, the term of this patent is extended or adjusted under 35 U.S.C. 154(b) by 0 days.

(21) Appl. No.: 16/921,903

(22) Filed: Jul. 6, 2020

(65) Prior Publication Data

US 2020/0348632 A1 Nov. 5, 2020

Related U.S. Application Data

(63) Continuation of application No. 16/006,715, filed on Jun. 12, 2018, now Pat. No. 10,705,492.

(60) Provisional application No. 62/518,497, filed on Jun. 12, 2017.

(51) Int. Cl.
  *G05B 13/04* (2006.01)
  *G05B 13/02* (2006.01)
  *G05B 17/02* (2006.01)
  *G05B 15/02* (2006.01)
  *F24F 11/63* (2018.01)

(52) U.S. Cl.
  CPC ....... *G05B 13/048* (2013.01); *G05B 13/0265* (2013.01); *G05B 15/02* (2013.01); *G05B 17/02* (2013.01); *F24F 11/63* (2018.01); *G05B 2219/2642* (2013.01)

(58) Field of Classification Search
  CPC ...... G05B 13/048; G05B 17/02; G05B 15/02; G05B 13/0265; G05B 2219/2642; F24F 11/63
  See application file for complete search history.

(56) References Cited

U.S. PATENT DOCUMENTS

| | | |
|---|---|---|
| 5,224,648 A | 7/1993 | Simon et al. |
| 6,119,125 A | 9/2000 | Gloudeman et al. |
| 6,967,565 B2 | 11/2005 | Lingemann |
| 7,010,789 B1 | 3/2006 | Kimelman et al. |
| 9,020,647 B2 | 4/2015 | Johnson et al. |
| 9,035,479 B1 | 5/2015 | Gates |
| 9,258,201 B2 | 2/2016 | McCoy et al. |

(Continued)

OTHER PUBLICATIONS

Nassif, N., Kajl, S., & Sabrouin, R. (Jul. 2005). Optimization of HVAC control system strategy using two-objective genetic algorithm, Journal of HVAC&R Research, 11(3), 459-486. (Year: 2005).

(Continued)

*Primary Examiner* — Ramesh B Patel
(74) *Attorney, Agent, or Firm* — Kunzler Bean & Adamson, PC (57) ABSTRACT

Apparatuses, systems, and methods of physical-model based building automation using in-situ regression to optimize control systems are presented. A simulation engine is configured to simulate a behavior or a controlled system using a physical model for the controlled system. A data stream comprises data from a controlled system. A training loop is configured to compare an output of a simulation engine to a data stream using a heuristic so that a physical model is regressed in a manner that the output of the simulation engine approaches the data stream.

20 Claims, 5 Drawing Sheets

(56) References Cited

U.S. PATENT DOCUMENTS

| | | | |
|---|---|---|---|
| 9,298,197 | B2 | 3/2016 | Matsuoka et al. |
| 9,557,750 | B2 | 1/2017 | Gust et al. |
| 9,664,400 | B2 | 5/2017 | Wroblewski et al. |
| 10,705,492 | B2* | 7/2020 | Harvey .................. G05B 17/02 |
| 2002/0152298 | A1 | 10/2002 | Kikta et al. |
| 2005/0097161 | A1* | 5/2005 | Chiou ................... H04W 16/18 709/200 |
| 2006/0106530 | A1 | 5/2006 | Horvitz et al. |
| 2007/0055392 | A1* | 3/2007 | D'Amato ............. G05B 13/048 700/44 |
| 2008/0082183 | A1 | 4/2008 | Judge |
| 2014/0016572 | A1 | 1/2014 | Porat et al. |
| 2014/0277765 | A1 | 9/2014 | Karimi et al. |
| 2014/0288890 | A1* | 9/2014 | Khainson ................ G06F 30/13 703/1 |
| 2014/0330611 | A1* | 11/2014 | Steven ............. G06Q 10/06314 705/7.24 |
| 2014/0358291 | A1 | 12/2014 | Wells et al. |
| 2015/0025917 | A1* | 1/2015 | Stempora ............. G06K 9/0061 705/4 |
| 2015/0066229 | A1 | 3/2015 | Lacroix et al. |
| 2015/0112497 | A1 | 4/2015 | Steven et al. |
| 2016/0016454 | A1 | 1/2016 | Yang et al. |
| 2016/0179075 | A1 | 6/2016 | Shin et al. |
| 2016/0201934 | A1 | 7/2016 | Hester et al. |
| 2017/0076206 | A1 | 3/2017 | Lastras-Montano et al. |
| 2017/0103483 | A1 | 4/2017 | Drees et al. |
| 2017/0315696 | A1* | 11/2017 | Jacobson ............ H04L 12/2809 |
| 2017/0329289 | A1* | 11/2017 | Kohn ................. G05B 13/0265 |

OTHER PUBLICATIONS

Sushanek, F., Kasneci, G., & Weikum, G. (May 2007). YAGO: A core of semantic knowledge unifying WordNet and Wikipedia, WWW 2007, 1-10. (Year: 2007).
Maasoumy, M., Pinto, A., & Sangiovanni-Vincentelli, A, (2001). Model-based hierarchical optimal control design for HVAC systems, Proceedings of the ASME 2011 Dynamic Systems and Control Conference, 1-8. (Year: 2011).
Bordes, A., Weston, J., Collobert, R., & Bengio, Y. (Aug. 2011). Learning structured embeddings of knowledge bases, Proceedings of the Twenty-Fifth AAAI Conference on Artificial Intelligence, 1-6. (Year: 2011).
Nickel, M., Tresp, V., & Kriegel, H. (2011). A three-way model for collective learning on multi-relational data, Proceedings of the 28th International Conference on Machine Learning, 1-8. (Year: 2011).
Socer, R., Chen, D., Manning, C., & Ng, A. (Jan. 2013). Reasoning with neural tensor networks for knowledge base completion, 1-10. (Year: 2013).
Berant, L., Chou, A., Frostig, R., & Ling, P. (Oct. 2013). Semantic parsing on Freebase from question-answer pairs, Proceedings of the 2013 Conference on Empirical Methods in Natural Language Processing, 1533-1544. (Year: 2013).
Bordes, A., Usunier, N., Garcia-Duran, A., Weston, J., & Yakhenko, O. (Apr. 2013). Irreflexive and hierarchical relations as translations, 1-5. (Year: 2013).
Bordes, A., Usunier, N., Garcia-Duran, A., Weston, J., & Yakhenko, O. (Dec. 2013). Translating embeddings for modeling multi-relational data, Neural Information Processing Systems (NIPS), 1-9. (Year: 2013).
Chang, K., Yih, W., & Meek, C. (Oct. 2013). Multi-relational latent semantic analysis, Proceedings of the Conference on Empirical Methods in Natural Language Processing (EMNLP), 1-11. (Year: 2013).
Weston, J., Bords, A., Yakhnenko, O, & Usunier, N. (Jul. 2013). Connecting language and knowledge bases with embedding models for relation extraction, 1-6 (Year: 2013).
Min, B., Grisham, R., Wan, L., Wang, C., & Gondex, D. (Jun. 2013). Distant supervision for relation extraction with an incomplete knowledge base, Proceedings of NAACL-HLT 2013, 777-782. (Year: 2013).
Wang, Z., Zhang, J., Feng, J., & Chen, Z. (2014). Knowledge graph embedding by translating on hyperplanes, Proceedings of the Twenty-Eighth AAAI Conference on Artificial Intelligence, 1112-1119. (Year: 2014).
Yang, B., Yih, W., He, X., Gao, J., & Deng, L. (Dec. 2014). Embedding entities and relations for learning and inference in knowledge bases, 1-12. (Year: 2014).
Bordes, A., Glorot, X., Weston, J., & Bengio, Y. (2014). A semantic matching energy function for learning with multi-relational data, Machine Learning, 94(2), 233-259. (Year: 2014).
Lin Y, Liu, Z., Sun, M., Liue, Y., & Zhu, X. (2015). Learning entity and relation embeddings for knowledge graph completion, in Proceedings of AAAI'15, 1-7. (Year: 2015).
He, H., Balakrishnan, A., Eric, M., & Liang, P. (Apr. 2017). Learning symmetric collaborative dialogue agents with dynamic knowledge graph embeddings, 1-11. (Year: 2017).
Carl-Eric Hagentoft, Assessment Method of Numerical Prediction Models for Combined Heat, Air and Moisture Transfer in Building Components: Benchmarks for One-dimensional Cases, Apr. 2004, Journal of Thermal Env. & Bldg. Sci., VI. 27, No. 4 (Year: 2004).
BigLadder Software, Occupant Thermal Comfort: Engineering Reference, 2014, The Board of Trustees of the University of Illinois and the Regents of the University of California through the Ernest Orlando Lawrence Berkeley National Labaratory (Year: 2014).
ANSI/ASHRAE Standard 55-2013: Thermal Environmental Conditions for Human Occupancy, ASHRAE, 2013.
De Dear, et at., "Developing an Adaptive Model of Thermal Comfort and Preference," ASHRAE Transactions 1998, vol. 104, Part 1.
Gagge et al., "An Effective Temperature Scale Based on a Simple Model of Human Physiological Regulatory Response," ASIYRAE Semiannnual Meeting in Philadelphia, Pennsylyania, Jan. 24-28, 1971.
Gagge, et. al., A Standard Predictive index of Human Response to the Thermal Environment, ASHRAE Transactions 1986, Part 2B.
Medhi, et al., Jan. 2011, "Model-Based Hierarchical Optimal Control Design for HVAC Systems," ASME 2011 Dynamic Systems and Control Conference and Bath/ASME Symposium on Fluid Power and Motion Control.
Nakahara, "Study and Practice on HVAC System Commissioning," The 4th international Symposium on HVAC, Beijing, China, Oct. 9-11, 2003.
Nassif, et al., "Self-tuning dynamic models of HVAC system components", Energy and Buildings 40 (2008) 1709-1720.
Nassif, Nabil, (2005), Optimization of HVAC control system strategy using two-objective genetic algorithm [microform].
Qin et al., "Commissioning and Diagnosis of VAV Air-Conditioning Systems," Proceedings of the Sixth International conference for Enhanced Building Operations, Shenzhen, China, Nov. 6-9, 2006.
Salsbury et al., "Automated Testing of HVAC Systems for Commissioning," Laurence Livermore National Laboratory, 1999, LBNL-43639.
Vaezi-Nejad, H.; Salsbury, T.; Choiniere, D. (2004). Using Building Control System for Commissioning. Energy Systems Laboratory (http://esl.tamu.edu); Texas A&M University (http://www.tamu.edu). Available electronically from http : / /hdl .handle .net /1969 .1 /5060.
Welsh, "Ongoing Commissioning (OCx) with BAS and Data Loggers," National Conference on Building Commissioning: Jun. 3-5, 2009.
Xiao et al., "Automatic Continuous Commissioning of Measurement Instruments in Air Handling Units," Building Commissioning for Energy Efficiency and Comfort, 2006, vol. VI-1-3, Shenzhen, China.
U.S. Appl. No. 15/986,746 Office Action dated Mar. 25, 2020.
U.S. Appl. No. 15/986,746 Office Action dated Aug. 7, 2019
U.S. Appl. No. 15/995,019 Final Office Action dated Apr. 15, 2020.
U.S. Appl. No. 15/995,019 Office Action dated Jul. 26, 2019.
U.S. Appl. No. 16/008,713 Final Office Action dated Jun. 18, 2020.
U.S. Appl. No. 16/008,713 Office Action dated Nov. 1, 2019.

(56) References Cited

OTHER PUBLICATIONS

U.S. Appl. No. 16/921,924 Notice of Allowance, dated Mar. 16, 2022.

* cited by examiner

HEURISTIC METHOD OF AUTOMATED AND LEARNING CONTROL, AND BUILDING AUTOMATION SYSTEMS THEREOF

FIELD

The present disclosure relates to control of building systems using automated means. More specifically the present disclosure relates to a model-based building automation system wherein a method of heuristic tuning or regression fitting is utilized with live building data to automatically improve the system model. The present disclosure particularly addresses the control and automation of HVAC, energy, lighting, and/or irrigation systems.

BACKGROUND

Building automation systems are used in buildings to manage energy systems, HVAC systems, irrigation systems, accessory building systems, controllable building structures, and the like.

There has been little effort toward incorporating these systems into a controller with a unified operational model, thus allowing a more intelligent means of managing the energy interrelationships between various building components and their respective control algorithms. This is due, in part, to the fact that the field has been dominated by model-free control loops, which have difficulty managing sophisticated, tightly-coupled systems or adaptively tuning complex models in a predictable manner.

There have been studies exploring the concept of automated commissioning, however the methods used to date have typically required an occupancy-free training period, during which the building is subjected to an artificial test regime, which limits the potential for retro-commissioning or continuous commissioning. More importantly, the work to date has been limited to simple HVAC systems having topologies known a priori, and lacks the ability to scale to complex ad hoc arrangements that represent the diversity of building topologies. In addition, the existing approaches lack a method of combined commissioning of non-HVAC or climate-adaptive energy interactive building components.

Efforts towards closed-loop control system auto-commissioning and optimization have been limited. Most efforts in the area of auto-commissioning have focused on a specific problem set, for example VAV commissioning, or air handler commissioning. The majority of the efforts to date have focused on manual commissioning through user analysis of building automation system data, user-driven computer tools for management of the commissioning process, commissioning test routines, or fault detection.

Recently, the most common approach in the industry has been to focus on building and energy monitoring and analytics with the intent of providing an energy "dashboard" for the building. The most sophisticated examples of dashboards provide statistical based diagnostics of equipment behavior changes, failures, or the like. This "outside-the-box-looking-in" approach can provide information, but relies on the administrator to understand the problem and close the loop, both of which are rare occurrences.

Efforts to date have used physical models as a reference, and benchmark the reference against the actual building using data mining to create control strategies. This requires a person in the loop, and thus limits applicability to projects with means for a highly skilled engineering team. It further requires buildings to be tested off-line, which is rarely acceptable.

Almost all building controls today are model-free. The model-free approach, while simple to implement, becomes quite difficult to manage and optimize as the complexity of the system increases. It also lacks the inherent self-knowledge to provide new approaches to programming, such as model-driven graphical programming, or govern the interconnections between components and sub-system synergistics.

Physical model based approaches to date have been limited in scope and specific to known models defined a-priori. They have thus lacked the ability to enable users to create n-complex systems of interconnected sub-systems by ad hoc means, use simple graphical user interfaces to define a system, or enable system model to evolve their control optimization and commissioning over time in situ.

SUMMARY

The present disclosure applies a closed loop, heuristically tuned, model-based control algorithm to building automation.

There are several advantages that can be gained from applying model-based control to building automation systems.

Model based control allows for altering control schemes based on external factors including but not limited to weather, occupancy, and user input. The physical system model allows for simulation of these external factors' effects on building comfort and efficiency. Once the effects of said factors on the system are known the controller can take the necessary control actions to compensate for the effects. For example, in some embodiments, a building with higher occupancy will require less heating or more cooling to offset the heat generated by the occupants.

Model based control allows for inclusion of predicted external factors. For example, in some embodiments, future weather predictions can be taken into account when deciding on control actions. This would allow the controller to more effectively utilize resources by building up energy stores while it is cheap and depleting stores when resources are expensive. In some embodiments, future occupancy predictions may be included in the model-based control system. A schedule may be monitored and comfort settings may be allowed to be changed to prioritize other factors like energy efficiency during times no occupancy is expected.

Model based control enables the system controller to consider any and all external and/or intrinsic influencing factors from all periods of time, current, past or future. This enables what may be called "future-forward control". This is the generation of a sequence or control regime prior to the application of the control regime.

Model based control allows for less complicated commissioning. The controller can perform the abstraction of the system into mathematical models. Removing this level of abstraction from the user allows for faster, easier, more accurate, and more flexible model creation.

Model based control also provides system labeling through a means of ontology. Because the purpose, behavior, and semantics of that behavior are known statically, the system can interpret the meaning of equipment or object behavior during runtime. Regressions of equipment models within the scope of their known ontologies enable adaptively fitted models in situ, and also detect faults as models lose compliance with their fit.

Model based control allows for real time system monitoring and software repair. By including a model of all of the equipment in the system, and sensing equipment performance, the controller may sense equipment faults when there is a significant divergence between system simulation outputs and sensor data. Because the controller has a model of the equipment's, sub-system's, or system's predicted operation, any deviation from normal operation may be investigated automatically. The knowledge of a fault allows for diagnostic, remediation, and/or alerting actions to be taken by the controller. The remediation of soft equipment faults is beneficial as it replaces the need for human interaction with malfunctioning equipment.

Model based control allows for changing control actions in response to time varying parameters. These parameters include but are not limited to equipment aging, weather, occupancy, equipment fault, insulation values, resource costs, and/or user input. Each of these parameters will affect control path calculations.

All of the benefits of model-based control systems may be extended by employing heuristic techniques which adjust based on past regressions. By allowing the model to be tuned by heuristics based on past regressions, the model can compensate for inaccuracies in the originally included data. The model can also interpolate unknown values to facilitate more complete system optimization.

While model based control can require increased user handling of parameters to fit a model to a controlled application, the present disclosure describes a methodology by which real-time regressions of stored "future-forward" control predicted sequences are compared to the actual time series of events as resulting from that control. This methodology can allow model based control to automate a system, then constantly learn from the system to tune its parameters so that only limited data is required to set up a system. This disclosure describes the method by which a fitted system can detect the system falling out of compliance through the same regression methodology.

DESCRIPTION OF THE DRAWINGS

To further clarify various aspects of some example embodiments of the present disclosure, a more particular description of the disclosure will be rendered by reference to specific embodiments thereof that are illustrated in the appended drawings. It is appreciated that the drawings depict only illustrated embodiments of the disclosure and are therefore not to be considered limiting of its scope. The disclosure will be described and explained with additional specificity and detail through the use of the accompanying drawings in which.

DESCRIPTION

The embodiments of the present disclosure described herein are not intended to be exhaustive or to limit the disclosure to the precise forms disclosed in the following detailed description. Rather, the embodiments are chosen and described so that others skilled in the art may appreciate and understand the principles and practices of the present disclosure.

The following embodiments and the accompanying drawings, which are incorporated into and form part of this disclosure, illustrate embodiments of the disclosure and together with the description, serve to explain the principles of the disclosure. To the accomplishment of the foregoing and related ends, certain illustrative aspects of the disclosure are described herein in connection with the following description and the annexed drawings. These aspects are indicative, however of, but a few of the various ways in which the principles of the disclosure can be employed and the subject disclosure is intended to include all such aspects and their equivalents. Other advantages and novel features of the disclosure will become apparent from the following detailed description of the disclosure when considered in conjunction with the drawings.

Explanation will be made below with reference to the figures referenced above for illustrative embodiments concerning the predictive building control loop according to the current disclosure.

Figure 1:
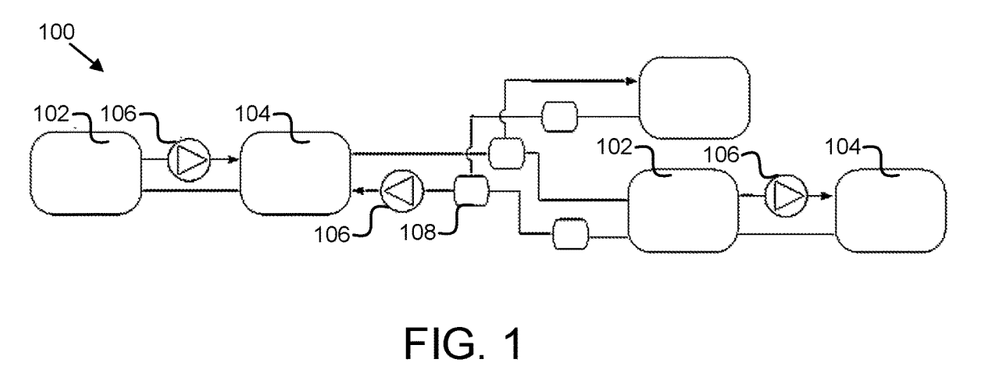
FIG. 1—Physical model system block diagram.
Figure 5:
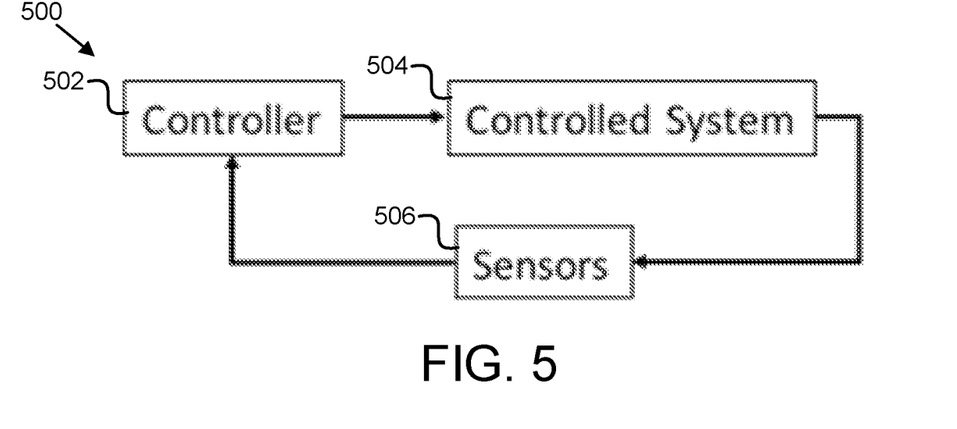
FIG. 5—Architectural embodiment of a building control loop.

A building control system contains a control loop 500 such as illustrated in FIG. 5. The control loop contains a controller 502 that makes decisions based on sensor 506 data or some other feedback mechanism. The control decisions are then applied to the controlled system 504. The controller 502 may be comprised of systems including but not limited to software, hardware, mechanical, and/or cloud based systems. The resulting effects on the system 504 are monitored by the feedback mechanism. An example of a building control loop 500 is: the sensor 506 data is comprised of an air temperature sensor 506, the controller 502 is comprised of a thermostat, and the controlled system 504 is comprised of a furnace, fan, air conditioner, and building. In this case the furnace and air conditioner are sources, the fan is a transport, and the building is a sink. The controlled system 504 can be represented as in FIG. 1; a system 100 comprised of sources 102, sinks 104, and transports 106, possibly with other intermediate components 108.

Figure 4:
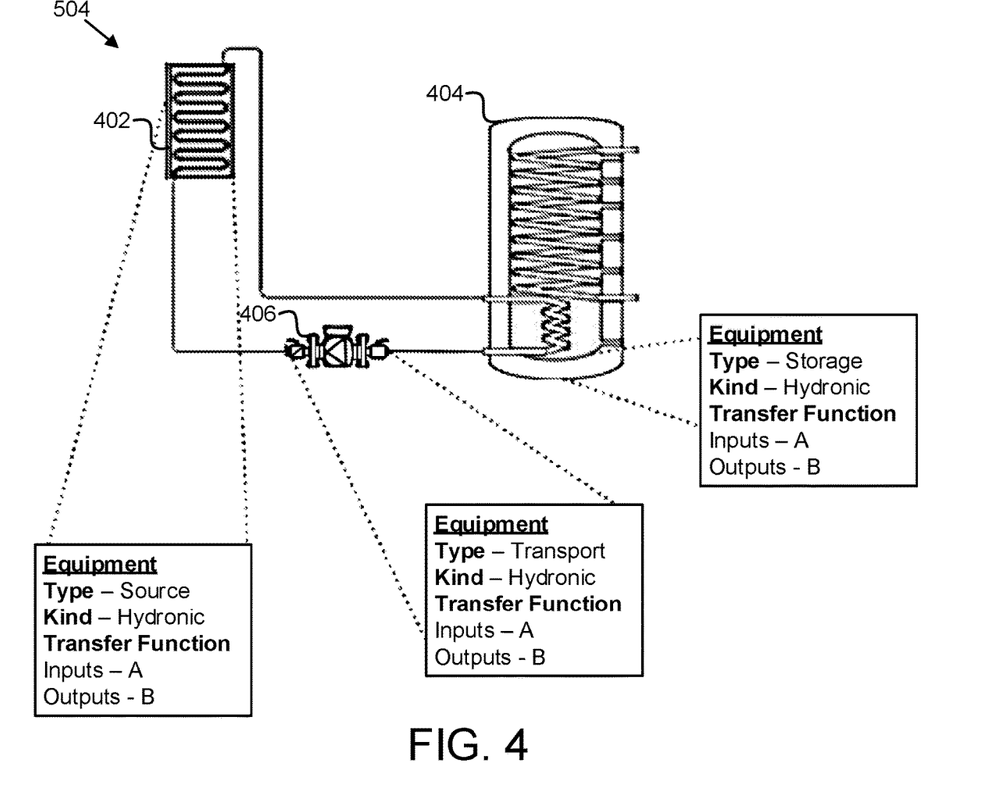
FIG. 4—Architectural embodiment of an example of a simple controlled system.

Another embodiment of a controlled system 504 is shown in FIG. 4. In FIG. 4 the controlled system 504 is comprised of a heat exchanger 402 acting as a source 102, a pump 406 as a transport 106, and a storage tank 404 as a sink 104.

Figure 2:
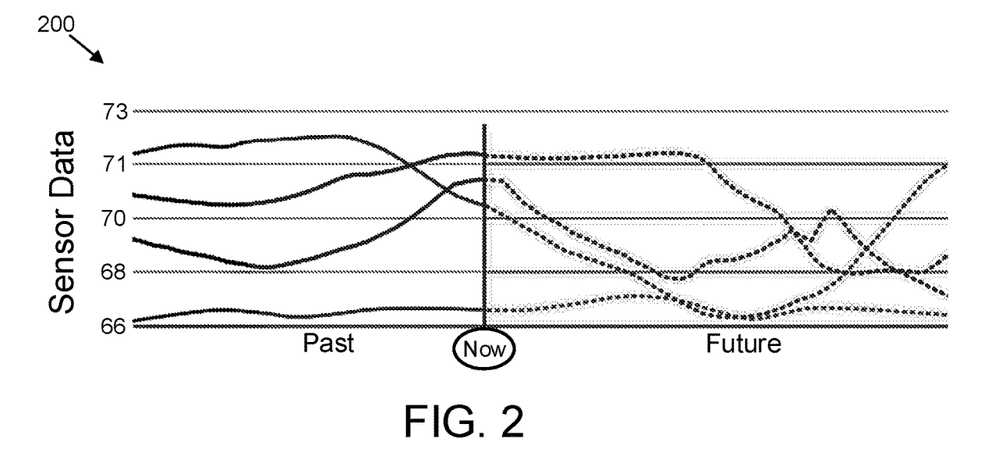
FIG. 2—Historical and predicted sensor values and time-series thereof.

One embodiment 200 in FIG. 2 shows how multiple sensors 506 may simultaneously feed data back to the controller 502 in a time series. This time series data may then be extended into the future by outputs of the simulation engine 602.

Figure 3:
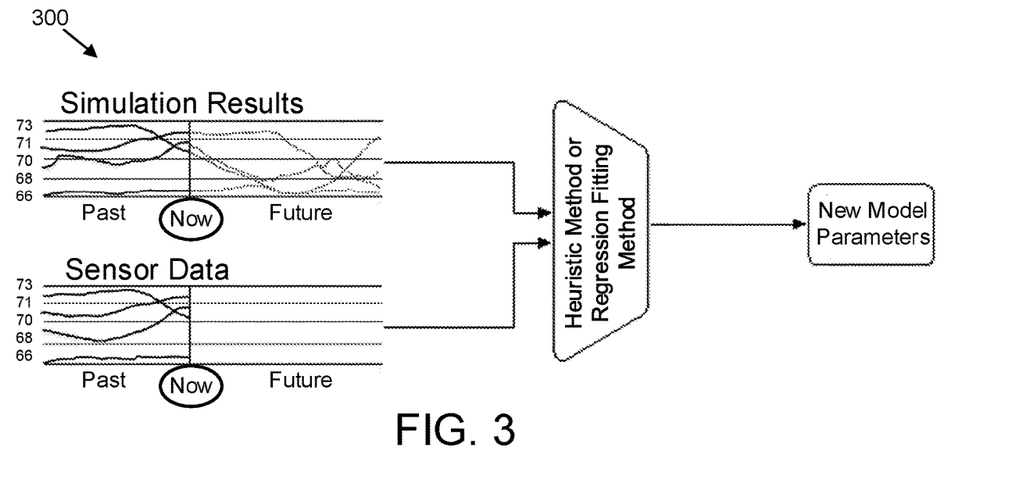
FIG. 3—Heuristic or regression fitting method.

The simulation engine 602 output may be compared with the actual sensor 506 data as shown in FIG. 3. By using a heuristic tuning method 300 any difference between the simulation engine 602 output and the sensor 506 data can be used to tune the physical model 604 parameters to better represent the controlled system 504. By constantly optimizing the model 604, any uncertainty or inaccuracy in the model(s) 604 can be rectified.

Figure 6:
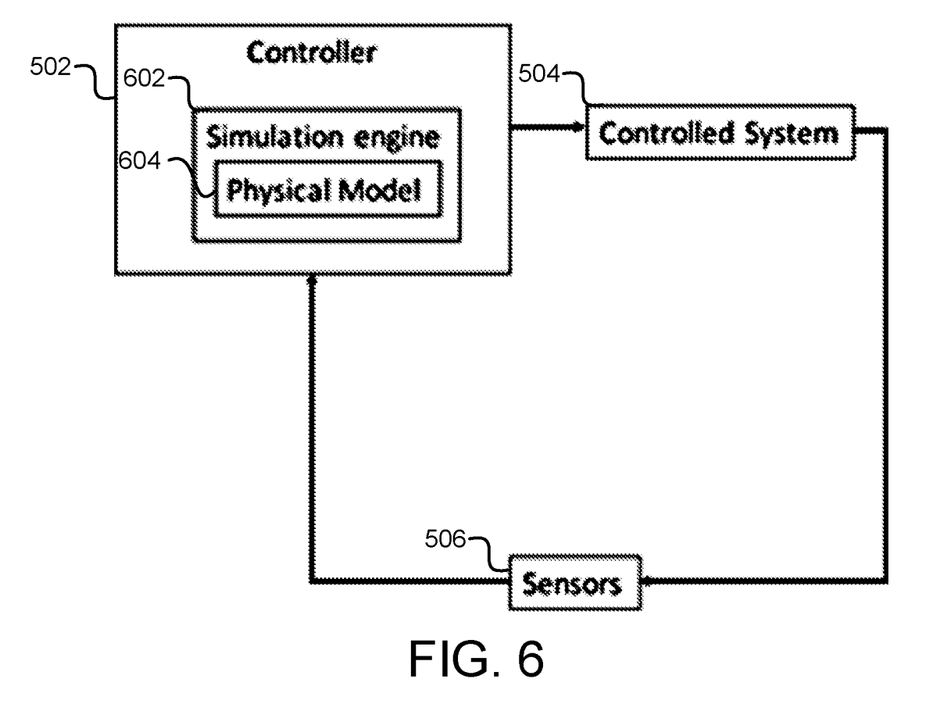
FIG. 6—Architectural embodiment of a building control loop containing a simulation engine wherein the simulation engine contains a physical model.

FIG. 6 shows a controller 502 containing a simulation engine 602. The simulation engine 602 in FIG. 6 may allow the building system controller 502 to predict the outcome of any available control action using its physical model 604 of the system 504. Said predictions have many benefits, some of which are detailed below.

The physical model 604 is defined as any model of the controlled system 504. The physical model 604 may be time variant. One form of time variance that may be included in the physical model 604 is comprised of heuristics. By employing heuristics, any control action may be evaluated, based on feedback from sensor 506 data or some other form of feedback, to evaluate whether the control action had the intended effect. If the control action did not have the intended effect, the physical model 604 may be changed to exert more effective control actions in the future.

Figure 7:
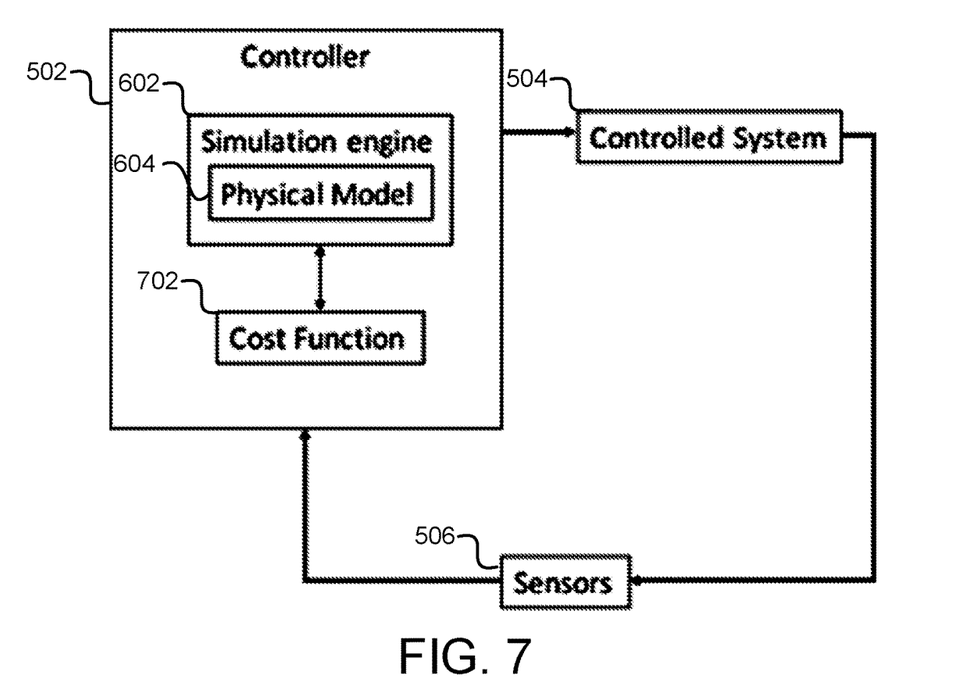
FIG. 7—Architectural embodiment of a building control loop containing a simulation engine and cost function wherein the simulation engine contains a physical model.

FIG. 7 shows how a cost function 702 may be applied to the simulation engine 602. Any and all resources may be given values in the cost function 702. Said resources include but are not limited to: natural gas, gasoline, propane, home heating oil, coal, water, electricity, emissions, equipment longevity, heat, and/or time outside of a defined comfort zone. Any possible control actions may be assessed according to the cost function 702 in order to discover the optimal control action according to the cost function 702. The cost function 702 may be time variant. The cost function 702 may be linked with factors including, but not limited to, monetary value of said resources, user preferences, and/or changes in the physical model 604.

Figure 8:
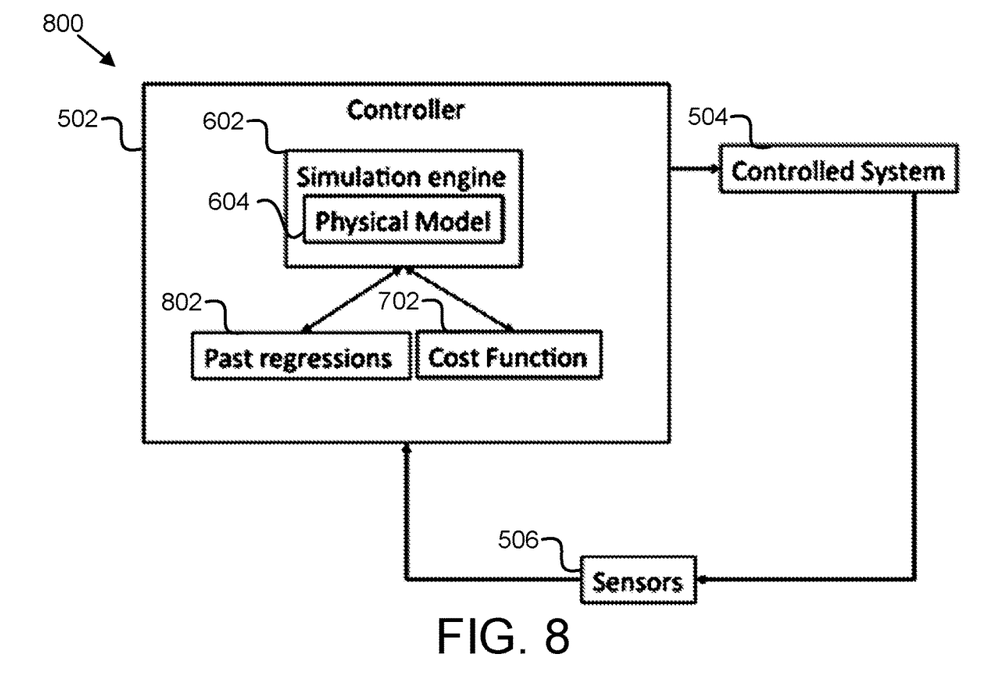
FIG. 8—Architectural embodiment of a building control loop containing a simulation engine and cost function wherein the simulation engine contains a physical model, which is tuned, based on past regressions.

FIG. 8 shows how heuristics may be included in a model-based building control system 800. Employing heuristics 802 with the physical model 604 allows the model 604 to be adaptive to issues such as time varying system elements, and/or inaccurate or incomplete starting datasets. By storing system reactions 802 to past control actions, the physical 604 model may be improved. Heuristics 802 may be implemented by comparing the data stream of the controlled system 504 to the output of the physical model-based simulation, as they respond to the same control stimuli. Any difference may be corrected by changing physical model 604 inputs to influence the physical model 604 outputs to match the data stream of the real world system 504. The use of a heuristic 802 or regression 802 algorithm to tune physical model 604 parameters allows for substantial increases in system optimization, efficiency, and stability.

Figure 9:
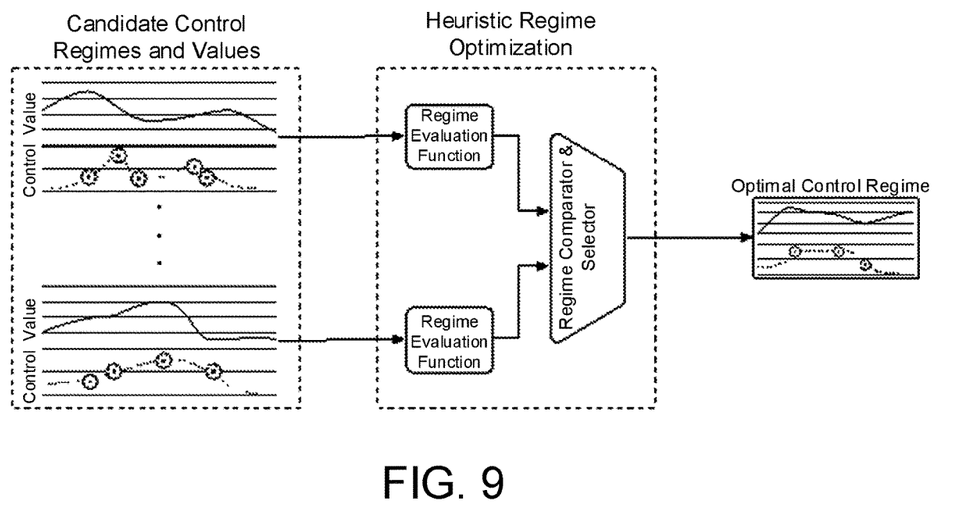
FIG. 9—Selection of optimal control regime from candidate control regimes.

FIG. 9 shows how candidate control schemes, comprising a collection of control actions and corresponding valuation of the control actions, may be evaluated and compared, thus allowing for selection of the optimal control scheme among the candidates.

Although the disclosure has been explained in relation to certain embodiments, it is to be understood that many other possible modifications and variations can be made without departing from the spirit and scope of the disclosure.

What is claimed is:

1. A building system controller comprising:
   a physical model for a controlled system;
   a simulation engine configured to simulate a behavior of the controlled system using the physical model for the controlled system;
   a data stream, comprising data from the controlled system; and
   a control loop configured to compare an output of the simulation engine to the data stream using a heuristic, such that the physical model is regressed, and to sense one or more faults in the controlled system in response to a divergence between the output of the simulation engine and the data stream.

2. The building system controller of claim 1, wherein the regressed physical model is utilized by the simulation engine to more accurately predict a future behavior of a control loop for the controlled system, such that an optimal control regime is accurately computed.

3. The building system controller of claim 2, wherein the optimal control regime minimizes a cost function such that the control loop controls the controlled system with a least expense, according to the cost function.

4. The building system controller of claim 2, wherein the optimal control regime is selected through comparison of one or more potential control regimes, wherein the comparison is performed by one or more of the following but not limited to: differential comparison, multivariate population selection, statistical classification, clustering, feature extraction, preference ranking, and benchmarking.

5. The building system controller of claim 1, wherein the regressed physical model is utilized to detect the one or more faults, by detecting divergent parameters through regression of a previously regressed model.

6. The building system controller of claim 1, wherein the control loop controls the controlled system.

7. The building system controller of claim 1, wherein the control loop controls the controlled system using the output of the simulation engine to predict a future behavior of the controlled system under an arbitrary control regime.

8. The building system controller of claim 7, wherein the control loop applies the arbitrary control regime to the controlled system and observes a response of the controlled system via the data stream, thereby completing the control loop.

9. The building system controller of claim 7, wherein the control loop utilizes a cost function of the physical model to evaluate a cost of the arbitrary control regime and the cost of the arbitrary control regime is evaluated in terms comprising one or more of, but not limited to: energy use, primary energy use, energy monetary cost, human comfort, a safety of a building or building contents, a durability of a building or building contents, microorganism growth potential, system equipment durability, system equipment longevity, environmental impact, and energy use $CO_2$ potential.

10. The building system controller of claim 1, wherein the controlled system comprises one or more of the following: building automation systems, heating systems, cooling systems, ventilation systems, power management systems, renewable energy systems, irrigation systems, occupancy systems, lighting systems, environmental control systems, humidity control systems, air quality management systems, window operators, and shade systems.

11. The building system controller of claim 1, wherein the physical model is regressed using one or more of the following, but not limited to: differential comparison, multivariate population selection, statistical classification, clustering, feature extraction, preference ranking, and benchmarking.

12. The building system controller of claim 1, wherein an extent to which the simulation engine output approaches the data stream comprises, but is not limited to: a convergence of predicted and observed values; a reduction in error between predicted and observed values to within an arbitrary threshold; a reduction in uncertainty of predicted values to within an arbitrary threshold; reaching an arbitrary threshold on number of erroneous predictions; reaching an arbitrary threshold on number of accurate predictions; reaching an arbitrary threshold on number of data points processed; and reaching an arbitrary threshold on computational time spent processing data.

13. The building system controller of claim 1, wherein the output of the simulation engine is compared to the data stream using the heuristic by one or more of, but not limited to: data slicing, time slicing, time windowing, time batching, parameter slicing, parameter windowing, single-point, and multi-point.

14. The building system controller of claim 1, wherein the heuristic comprises one or more of, but is not limited to: decomposition methods, inductive methods, reduction methods, constructive methods, and local search methods.

15. The building system controller of claim 1, wherein the heuristic comprises one or more of a heuristic, a metaheuristic, and a hyperheuristic comprising, but not being limited to, one or more of: particle swarm organization, self-organizing migration algorithm, neural networks, group method of data handling, differential evolution, genetic algorithm, memetic algorithm, random forest, hill climbing algorithm, simulated annealing, monte-carlo methods, random search, fuzzy-logic, arithmetic mean, geometric mean, harmonic mean, trimean, median, mode, mid-range, quadratic mean (RMS), cubic mean, generalized mean, weighted mean, linear regression, logistic regression, polynomial regression, k-means clustering, k-nearest neighbors, decision trees, perceptron, multi-layer perceptron (neural network), kernel methods, support vector machines, ensemble methods, boosting, bagging, nave Bayes, expectation maximization, Gaussian mixture models, Gaussian processes, principal component analysis, singular value decomposition, reinforcement learning, Voronoi decomposition, social theory voting techniques, social theory voting concepts, social welfare functions, social choice functions, single transferrable vote, Bucklin's rule, social decision schemes, collective utility functions, Condorcet method, Condorcet method extensions, Copeland's rule, maximin, Dodgson's rule, Young's rule, and ranked pairs.

16. The building system controller of claim 1, wherein the data stream comprises one or more of, but is not limited to: a data store and a real-time data feed.

17. The building system controller of claim 1, wherein the data stream comprises one or more of, but is not limited to: sensor data, actuation data, system parameters, equipment state, weather data, environmental data, occupant input, and occupant behavior.

18. The building system controller of claim 1, wherein a training loop regresses the physical model by comparing the output of the simulation engine to the data stream using the heuristic to improve the physical model, by one or more of varying model parameters and adapting an underlying structure and composition of the physical model.

19. A system comprising:
a coupled building system;
a data stream;
at least one memory; and
one or more processors operatively coupled to the data stream and the one or more processors operatively coupled to the at least one memory, wherein the one or more processors are configured to execute program code stored in the at least one memory to:
control the coupled building system;
receive sensor measurements obtained from the data stream;
store the sensor measurements in the at least one memory;
compute a mathematical model that substantially imitates a behavior of the controlled system, generating a predicted data stream measurement from the mathematical model;
analyze a variation between the stored sensor measurements and the predicted data stream measurement, to determine a divergence; and
sense one or more faults in the coupled building system in response to the determined divergence.

20. The system of claim 19, wherein the mathematical model is computed repeatedly, in arbitrary order, to evaluate each of an arbitrary number of different physical models, the one or more processors comprise one or more computational entities in a network of simulation engines, and the one or more processors comprise collocated computational entities as well as remote computational entities.

* * * * *